(12) United States Patent
Long

(10) Patent No.: US 8,365,064 B2
(45) Date of Patent: Jan. 29, 2013

(54) HYPERLINKING WEB CONTENT

(75) Inventor: James Andrew Long, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 232 days.

(21) Appl. No.: 12/543,755

(22) Filed: Aug. 19, 2009

(65) Prior Publication Data

US 2011/0047447 A1 Feb. 24, 2011

(51) Int. Cl.
*G06F 17/00* (2006.01)
*G06F 17/30* (2006.01)

(52) U.S. Cl. ........................ 715/208; 707/723
(58) Field of Classification Search .................. 715/205, 715/208, 231, 273; 707/706, 707, 722, 723, 707/735

See application file for complete search history.

(56) References Cited

U.S. PATENT DOCUMENTS

| | | | | |
|---|---|---|---|---|
| 6,392,668 | B1 * | 5/2002 | Murray .......................... | 715/738 |
| 6,874,019 | B2 * | 3/2005 | Hamilton et al. ............. | 709/219 |
| 7,346,605 | B1 * | 3/2008 | Hepworth et al. .................... | 1/1 |
| 7,844,602 | B2 * | 11/2010 | Katwala et al. ............... | 707/723 |
| 7,844,891 | B2 * | 11/2010 | Chandra ........................ | 715/208 |
| 7,890,501 | B2 * | 2/2011 | Lunt et al. .................... | 707/722 |
| 8,166,056 | B2 * | 4/2012 | Hong et al. .................... | 707/756 |
| 2001/0037377 | A1 * | 11/2001 | Nakano et al. ................ | 709/219 |
| 2003/0184582 | A1 * | 10/2003 | Cohen ........................... | 345/736 |
| 2004/0205558 | A1 * | 10/2004 | Holloway et al. ............. | 715/513 |
| 2005/0097179 | A1 * | 5/2005 | Orme ............................. | 709/207 |
| 2006/0031183 | A1 * | 2/2006 | Oral et al. ......................... | 707/1 |
| 2006/0074903 | A1 * | 4/2006 | Meyerzon et al. ................ | 707/5 |
| 2006/0101003 | A1 * | 5/2006 | Carson et al. .................... | 707/3 |
| 2006/0212441 | A1 * | 9/2006 | Tang et al. ........................ | 707/5 |
| 2007/0050711 | A1 * | 3/2007 | Walker et al. ................. | 715/530 |
| 2007/0208755 | A1 * | 9/2007 | Bhatkar et al. .................. | 707/10 |
| 2008/0005064 | A1 * | 1/2008 | Sarukkai .......................... | 707/3 |
| 2008/0027933 | A1 * | 1/2008 | Hussam .......................... | 707/6 |
| 2008/0082903 | A1 * | 4/2008 | McCurdy et al. ............. | 715/200 |
| 2008/0133754 | A1 * | 6/2008 | Smyth et al. .................. | 709/226 |
| 2008/0222130 | A1 * | 9/2008 | Patel et al. ....................... | 707/5 |
| 2008/0281676 | A1 * | 11/2008 | Stahura et al. ................. | 705/10 |
| 2008/0281794 | A1 * | 11/2008 | Mathur ........................... | 707/3 |
| 2009/0006391 | A1 * | 1/2009 | Ram ............................... | 707/6 |
| 2009/0012869 | A1 * | 1/2009 | Henkin et al. ................. | 705/14 |
| 2009/0030919 | A1 * | 1/2009 | Brezina et al. ............... | 707/100 |
| 2009/0150353 | A1 * | 6/2009 | Laakso et al. .................... | 707/3 |
| 2009/0164949 | A1 * | 6/2009 | Henkin et al. ................ | 715/862 |
| 2009/0204610 | A1 * | 8/2009 | Hellstrom et al. ................ | 707/5 |

(Continued)

OTHER PUBLICATIONS

Yesilada, Yeliz, et al, "Chose: Dynamic Linking of Web Resources", Sun Microsystems, Inc, Mar. 2007, pp. 1-83.*

*Primary Examiner* — Laurie Ries
(74) *Attorney, Agent, or Firm* — Hickman Palermo Truong Becker Bingham Wong LLP

(57) ABSTRACT

In one embodiment, access a first one of one or more network resources, the first network resource comprising one or more keywords. For each of the keywords of the first network resource: request a search engine to conduct a search on the keyword; obtain one or more second ones of the network resources identified by the search engine as a result of the search conducted on the keyword; and associate the second network resources identified for the keyword with the keyword. Rank the keywords of the first network resource according to their relative degrees of popularity based at least on a number of the network resources tagged with the keyword. Visually distinguish the keywords of the first network resource according to their popularity ranking.

18 Claims, 3 Drawing Sheets

U.S. PATENT DOCUMENTS

2009/0287567 A1* 11/2009 Penberthy et al. ......... 705/14.43
2009/0299978 A1* 12/2009 Farfurnik et al. ................. 707/3
2010/0082570 A1* 4/2010 Altaf et al. .................... 707/706
2011/0016104 A1* 1/2011 Leconte ........................ 707/706

* cited by examiner

HYPERLINKING WEB CONTENT

TECHNICAL FIELD

The present disclosure generally relates to hyperlinking content between network resources.

BACKGROUND

On the Internet, deep linking is the process of making a hyperlink from within a first network resource to a second network resource that is not a website's main or home page. The first network resource and the second network resource may belong to the same website or to different websites. A deep link is functionally equivalent to a hyperlink and provides a convenient way for network users to retrieve an inter-linked network resource. Within any network resource, there are potentially a number of words that correlate to other published network resources on the Internet. There are many websites, such as Wikipedia (http://ww.wikipedia.org/), that use deep links for respectively linking words in one web page with other web pages that contain further description of the words.

SUMMARY

The present disclosure generally relates to hyperlinking content between network resources.

According to particular embodiments, a computer implemented tool comprises one or more software components that are operable to: access a first one of one or more network resources, the first network resource comprising one or more keywords; for each of the keywords of the first network resource: request a search engine to conduct a search on the keyword, obtain one or more second ones of the network resources identified by the search engine as a result of the search conducted on the keyword, and associate the second network resources identified for the keyword with the keyword; rank the keywords of the first network resource according to their relative degrees of popularity based at least on a number of the network resources tagged with the keyword; and visually distinguish the keywords of the first network resource according to their popularity ranking.

These and other features, aspects, and advantages of the disclosure are described in more detail below in the detailed description and in conjunction with the following figures.

DETAILED DESCRIPTION

Figure 1:
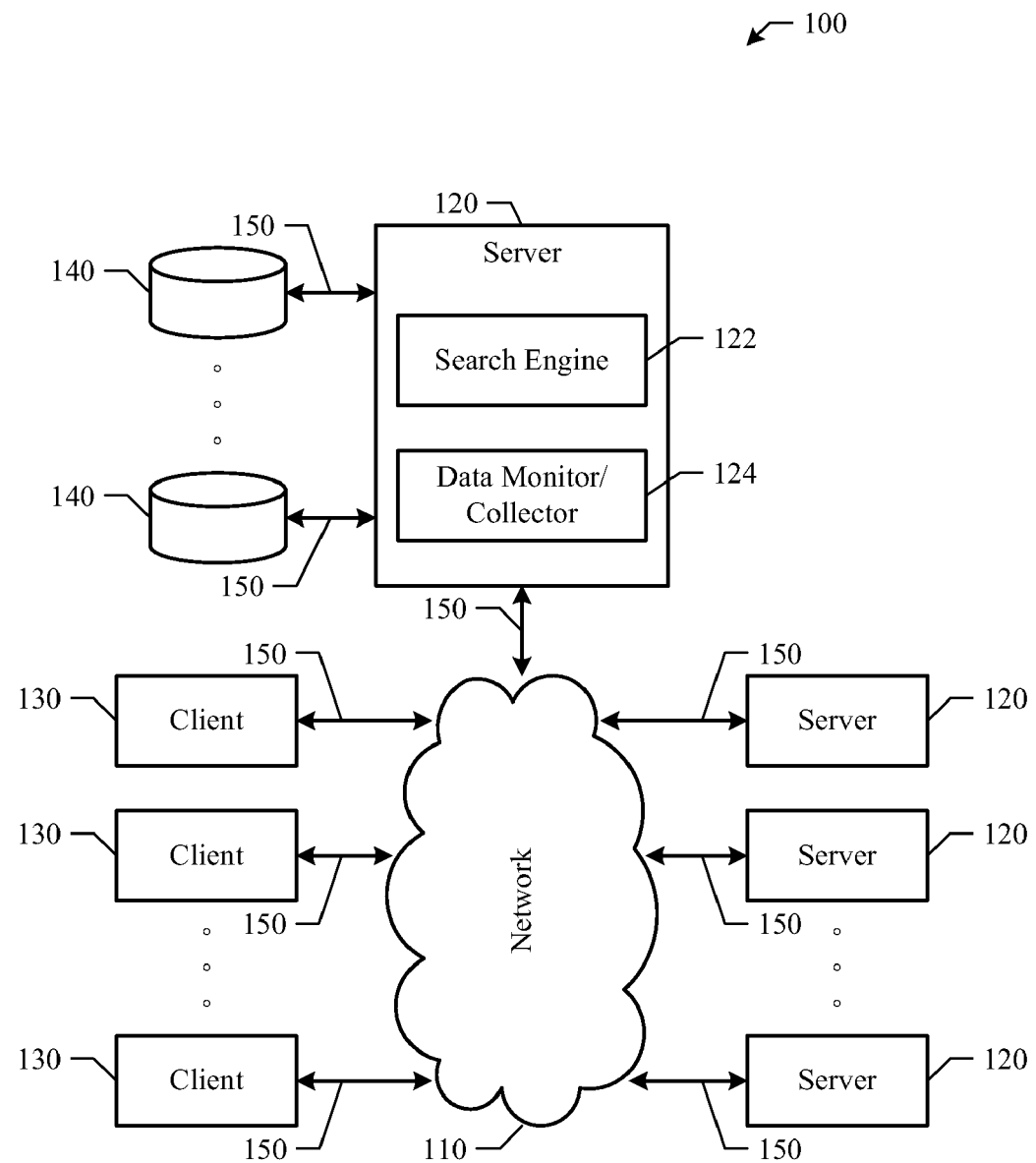
FIG. 1 illustrates an example network environment.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Deep linking is the process of creating a hyperlink accessible from a first network resource that accesses a specific second network resource, e.g., web page, image, or other content that is not a website's main or home page. Deep links may inter-link network resources either within the same website or between two different websites. Within any network resource, there are potentially many words, referred to as "keywords" hereafter, that correlate to other published network resources on the Internet. Websites, e.g., Wikipedia (http://www.wikipedia.org/), use deep links for respectively linking keywords in a first network resource with second network resources that contain further description of the keyword or are related to the keyword.

In any given network resource, there may be a number of keywords that may be deep linked with other network resources within the same website or in other websites. Due to the potentially large number of keywords within each network resource that may have deep links, it may be very time and labor intensive to manually link each of these keywords with a particular second network resource. People, e.g. web page editors, network resource editors, or network users, need to first manually identify the most popular keywords in a network resource, then find relevant network resources with which to link the keywords, and finally, actually link the most relevant network resources with the keywords in the first network resource.

Increasing the number of network resources within a website that are deep linked to other relevant network resources within the same website or different websites improves the website's usability and ranking within search results displayed by a search engine in response to a search request. Network resources that have more deep links may be ranked higher because more deep links may indicate that these network resources are more popular than other network resources.

Particular embodiments provide a convenient tool that helps network resource editors to establish deep links within individual network resources. Particular embodiments may implement the tool as computer software that includes one or more software components performing the appropriate functionalities supported by the tool.

To establish deep links in a particular network resource, particular embodiments may issue the keywords in the network resource to a search engine to obtain a set of related network resources for each of the keywords. Each set of related network resources identified by the search engine for each keyword is associated with the keyword. Particular embodiments may rank the keywords according to their relative degrees of popularity among the network resources and then visually distinguish the keywords according to their popularity ranking.

Particular embodiments may be implemented in a network environment. FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 110 or a combination of two or more such networks 110. The present disclosure contemplates any suitable network 110.

One or more links 150 couple servers 120 or clients 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a communications network, a satellite network, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores.

In particular embodiments, a client 130 may be an electronic device including hardware, software, or embedded logic components or a combination of two or more such components and capable of carrying out the appropriate functionalities implemented or supported by client 130. For example and without limitation, a client 130 may be a desktop computer system, a notebook computer system, a netbook computer system, a handheld electronic device, or a mobile telephone. A client 130 may enable an Internet user at client 130 to access network 110. A client 130 may have a web browser, such as Microsoft Internet Explorer or Mozilla Firefox, and may have one or more add-ons, plug-ins, or other extensions, such as Google Toolbar or Yahoo Toolbar. A client 130 may enable its user to communicate with other users at other clients 130. The present disclosure contemplates any suitable clients 130.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. Particular embodiments may provide interfaces that enable servers 120 or clients 130 to manage, e.g., retrieve, modify, add, or delete, the information stored in data storage 140. In particular embodiments, data storage 140 may have suitable types of database software, such as, for example and without limitation, ORACLE DATABASE, SYBASE SQL SERVER, or MICROSOFT SQL SERVER, which are capable of managing the data stored in data storage 140 and enabling servers 120 or clients 130 to access the stored data. The present disclosure contemplates any suitable data storage 340. In particular embodiments, the sporting event data, which may include the past, current, and predicted future sporting event data, and the calculated values of the sporting events may be stored in one or more data storages 140.

In particular embodiments, a server 120 may include a search engine 122 and data monitor/collector 124. Search engine 122 or data monitor/collector may include hardware, software, or embedded logic components or a combination of two or more such components for carrying out the appropriate functionalities implemented or supported by search engine 122 and data monitor/collector 124. For example and without limitation, search engine 122 may implement one or more search algorithms that may be used to identify network contents in response to the search queries received at search engine 122, one or more ranking algorithms that may be used to rank the identified network contents, one or more summarization algorithms that may be used to summarize the identified network contents, and so on. Search engine 122 may conduct a search for each keyword found in a first network resource and identifies a set of second network resources that may be related to the keyword in the first network resource. For example and without limitation, data monitor/collector 122 may monitor or collect information from a plurality of network resources found within websites and the one or more keywords within each network resource.

Figure 2:
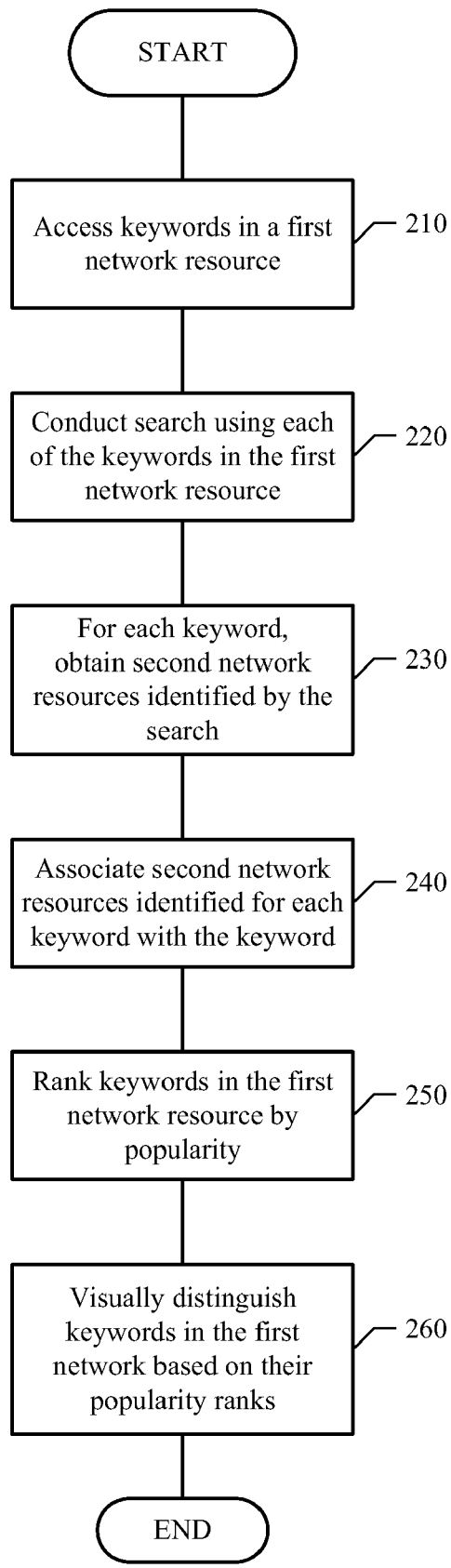
FIG. 2 illustrates an example method of linking content in one network resource to one or more other network resources.

FIG. 2 illustrates an example method of hyperlinking content between web pages. The steps illustrated in FIG. 2 may be performed with any website on the Internet, where each website may contain the first network resource or the second network resource, or both. The deep links that may be created using the method of FIG. 2 may link to other network resources within the same website or to any other website where the network resource is not the main or home page.

Particular embodiments may access one or more keywords in a first network resource, as illustrated in step 210. In particular embodiments, a first network resource may be any type of network resource identified by a Uniform Resource Locator (URL) that specifies where the corresponding network resource is located and the mechanism for retrieving it and contains one or more words. Examples of the first network resource includes, but are not limited to web pages, text files, pictures, or content created using other technologies, such as Adobe Flash, Adobe Flex, or asynchronous JavaScript and XML (AJAX). Keywords may comprise any of one or more words within the network resource. In particular embodiments, the first network resource contains one or more words. For example, a first network resource may contain the following text:

"Just as soon as the government's "Cash-for-Clunkers" program started, it nearly stopped. But it seems it may restart, since the House speedily voted to fund an additional $2 billion for the popular program. Clearly, it did what it was supposed to do—inspire people to buy cars and jump-start a struggling U.S. auto industry. All eyes are on the Senate to see if it will concur with the House on the additional spending to keep the program going."

In particular embodiments, the keywords may be determined from the text of the first network resource by identifying the most commonly searched terms or phrases within the text. Search engines, such as those provided by Yahoo!® Inc. (http://search.yahoo.com) and Google™ (http://www.google.com), conduct searches based on a query phrase using various search algorithms and generate a search result that identifies network resources that are most likely to be related to the query phrase. By accessing search data of one or more of the search engines, the keywords may be determined from the most common query phrases that correlate to one or more words within the text of the first network resource. The following table illustrates keywords that may be identified in the above example text by accessing common query phrases from a search engine:

| Keywords |
| --- |
| the House |
| the Senate |
| U.S. Auto Industry |

In particular embodiments, the keywords may be determined by identifying all of the nouns within the text of the first network resource. In particular embodiments, the keywords may be determined by identifying all of the root words of the nouns within the text of the first network resource. In other particular embodiments, the keywords may be determined by identifying all of the nouns or phrases including nouns within the text of the first network resource. The following table illustrates examples of keywords that may be identified in the above example text by accessing nouns, root nouns, or phrases:

| Keywords | | |
| --- | --- | --- |
| Nouns | Root Nouns | Nouns or Phrases |
| government | government | government |
| cash | cash | cash |
| clunker | clunker | clunker |
| program | program | program |
| House | House | House |
| people | people | people |
| cars | car | cars |
| U.S. | U.S. | U.S. |
| auto | auto | auto |
| industry | industry | industry |
| eyes | eye | eyes |
| senate | senate | senate |
| | | Cash-for-Clunkers program |
| | | the House |
| | | U.S. Auto Industry |
| | | the Senate |

Particular embodiments may conduct a search using each of the keywords in the first network resource, as illustrated in step 220. As mentioned above, search engines conduct searches based on a query phrase using various search algorithms and generate a search result that identifies network resources that are most likely to be related to the query phrase. In addition, a search engine often ranks the identified network resources according to their relative degrees of relevance with respect to the query phrase, such that the network resources that are relatively more relevant to the query terms are ranked higher and consequently are presented to the network user before the network resources that are relatively less relevant to the query terms. In particular embodiments, a search is conducted for each of the keywords in the first network resource using a search engine, where the query phrase is the keyword.

Particular embodiments may, for each keyword, obtain second network resources identified by the search, as illustrated in step 230. In particular embodiments, a second network resource may be any type of content identified by a Uniform Resource Locator (URL) that specifies where the corresponding web page is located and the mechanism for retrieving it. Examples of the second network resource includes, but are not limited to, web pages, text files, audio files, video files, graphical files, executables, or content created using other technologies, such as Adobe Flash, Adobe Flex, or AJAX. Note that in particular embodiments, unlike the first network resource, each second network resource may or may not contain any word.

As indicated above, in practice, a search engine may identify hundreds, thousands, or even millions of individual network resources in response to a search query depending on the relevance or commonness of the subject matter described by the query phrase. For example, in response to the query phrase "U.S. auto industry", the search engine provided by Yahoo!® Inc. identifies approximately 110,000,000 web pages. Particular embodiments may only select a predetermined number or percentage of top-ranking network resources identified for each keyword instead of all of the network resources identified for the keyword. For example, for keyword "U.S. auto industry", although a search engine may have identified 110,000,000 web pages as containing content relating to "U.S. auto industry", only the top-ranking 20 web pages may actually be selected for keyword "U.S. auto industry" and associated with keyword "U.S. auto industry" as described below.

Particular embodiments may associate the second network resources identified for each keyword with that keyword, as illustrated in step 240. Note that the second network resources associated with each keyword may not necessarily include all the network resources identified by a search engine for the keyword. As described above, particular embodiments may select a predetermined number or percentage of top-ranking network resources identified for each keyword and associate these top-ranked network resources with the keyword.

In particular embodiments, for each keyword, each of the second network resources associated with the keyword may have an URL that specifies where the corresponding second network resource is located and the mechanism for retrieving it. For each keyword, particular embodiment may hyperlink the keyword with one of the second network resources associated with the keyword. Particular embodiments may use the URL of the second network resource when hyperlinking keyword to the corresponding second network resource.

For example, with HTML, a hyperlink may be created using the "<a>" element, and more specifically using the code "<a href="URL">keyword</a>". Suppose one of the network resources identified for keyword "U.S. auto industry" has an URL "www.reuters.com/news/globalcoverage/autos". Hyperlinking keyword "U.S. auto industry" to this second network resource in HTML may be achieved using the code "<a href="http://www.reuters.com/news/globalcoverage/autos">U.S. auto industry</a>".

Hyperlinking a keyword to a corresponding second network resource may be performed manually, e.g., by a network resource editor. For each keyword, particular embodiments may present the second network resources associated with the keyword to a network resource editor. The network resource editor may review the second resources associated with each keyword and select one of the second network resources that appears to be most interesting to the network resource editor. Particular embodiments may then hyperlink the keyword to the particular second network resource selected by the network resource editor.

Hyperlinking a keyword to a corresponding second network resource may be performed automatically. For each keyword, particular embodiment may hyperlink the keyword to the top-linked second network resource associated with the keyword.

The hyperlink between a keyword of the first network resource and the URL of a second network resource may be a clickable link showing the keyword and deep linking to the URL of the second network resource. The following table illustrates example keywords and the URLs to which they are deep linked:

| Keywords | Deep Link URL |
| --- | --- |
| "Cash-for-Clunkers" program | http://shine.yahoo.com/channel/life/quot-cash-for-clunkers-quot-program-aims-to-drive-up-car-sales-478414/ |
| the House speedily voted to fund an additional $2 billion | http://news.yahoo.com/s/ap/20090731/ap_on_go_co/us_cash_for_clunkers_39 |
| eyes are on the Senate to see if it will concur | http://news.yahoo.com/s/ap/20090731/ap_on_go_co/us_cash_for_clunkers_39 |

Particular embodiments may rank the keywords in the first network resource by popularity, as illustrated in step 250. The popularity ranking of each keyword in the first network resource may be determined by accessing the search data of one or more search engines for the most common query phrases. Each keyword may then be ranked in relation to the other keywords according to its relative degree of popularity as a query phrase issued to the search engines.

In particular embodiments, the popularity ranking of each keyword in the first network resource may be determined by accessing tag information in a network resource for to determine whether the keyword is among the tags of the network resource. A tag or page tag may be a small JavaScript code located within each network resource of a website. Web analytics technology may utilize page tagging for collecting web analytics data and for analyzing visitor behavior. For example, each time a web page is requested, the web page may automatically run the JavaScript and send information to a remote server indicating that the user has successfully viewed the web page. Data may be collected at the remote server that is associated with successful page views by users. The greater the number of successful page views by users may indicate that a particular web page is more popular. In particular embodiments, each keyword may then be ranked in relation to the other keywords according to its relative degree of popularity among the network resources based on tag information for successful page views.

Particular embodiments may visually distinguish keywords in the first network resource based on their popularity ranks, as illustrated in step 260. The keywords may be visually distinguished by color, size, highlighting, font, or other visual indication. Depending on the popularity ranking for each keyword, there may be a range of visual indications depending on whether the keyword has a higher popularity ranking than other keywords. For example, if the keyword "Senate" was a more popular keyword than "House", then it may have a darker shade of highlighting than the less popular keyword. The following shows an example of visual indication of the keywords within the above example text that are deep linked to other URLs:

"Just as soon as the government's "Cash-for-Clunkers" program started, it nearly stopped. But it seems it may restart, since the House speedily voted to fund an additional $2 billion for the popular program. Clearly, it did what it was supposed to do—inspire people to buy cars and jump-start a struggling U.S. auto industry. All eyes are on the Senate to see if it will concur with the House on the additional spending to keep the program going."

In particular embodiments, there may be a threshold requirement based on popularity to determine whether keywords are visually distinguished from the other words within the first network resource. In particular embodiments, only the keywords that exceed the threshold requirement may be visually distinguished from the other words within the first network resource. In the example above, "'Cash-for-Clunkers' program" may have surpassed a popularity threshold requirement, whereas "U.S. auto industry" may have URLs that could be associated with it, but because it did not meet the popularity threshold requirement, is not visually distinguished from the other words in the paragraph.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 3:
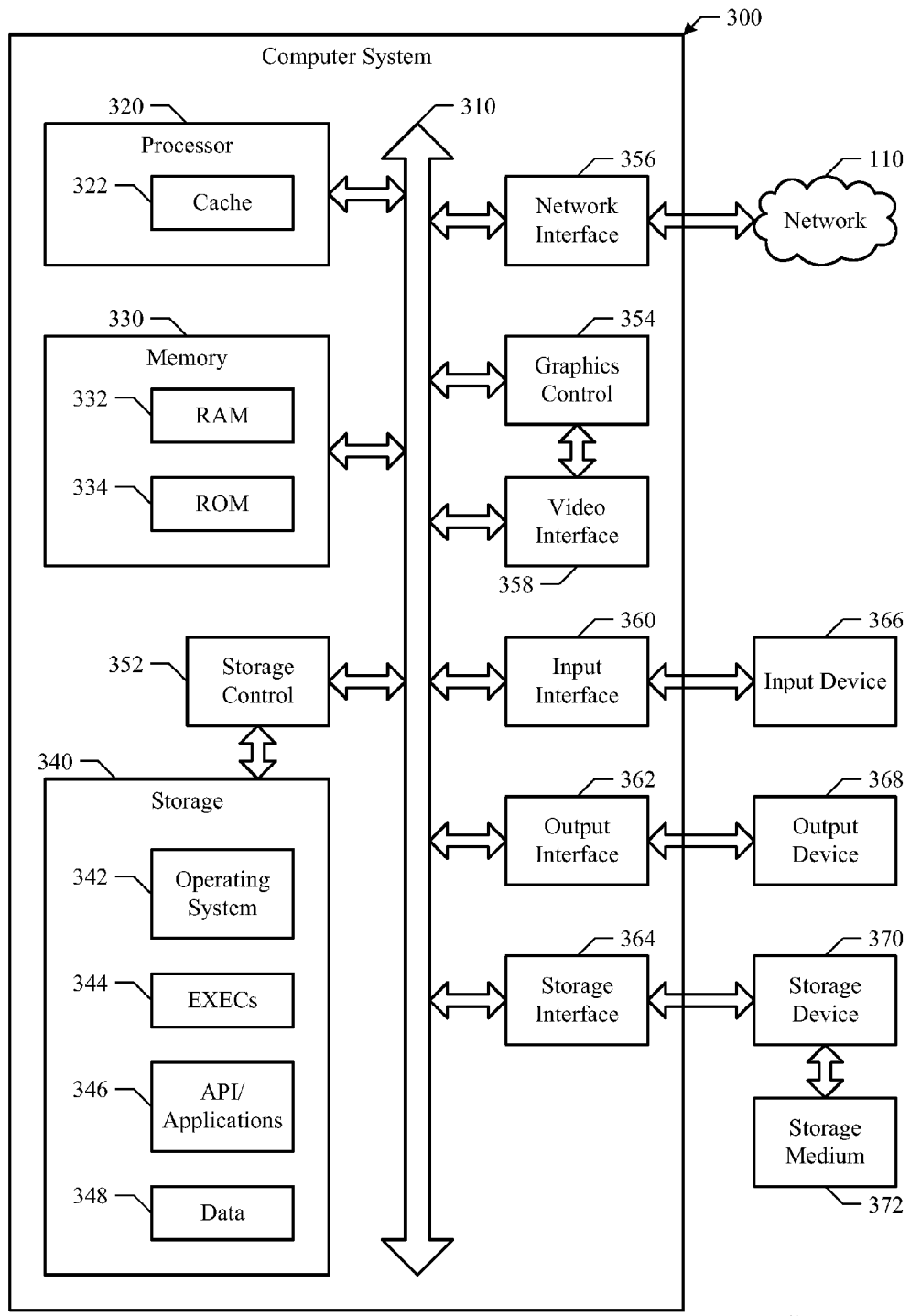
FIG. 3 illustrates an example computer system.

For example, FIG. 3 illustrates an example computer system 300 suitable for implementing one or more portions of particular embodiments. Although the present disclosure describes an illustrates a particular computer system 300 having particular components in a particular configuration, the present disclosure contemplates any suitable computer system having any suitable components in any suitable configuration. Moreover, computer system 300 may take any suitable physical form, such as for example one or more integrated circuits (ICs), one or more printed circuit boards (PCBs), one or more small handheld devices (such as mobile telephones or PDAs), on or more personal computers, or one or more super computers.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing). Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 320 (or central processing units (CPUs)). A processor 320 may contain a cache 322 for temporary local storage of instructions, data, or computer addresses. Processors 320 are coupled to one or more storage devices, including memory 330. Memory 330 may include random access memory (RAM) 332 and read-only memory (ROM) 334. Data and instructions may transfer bidirectionally between processors 320 and RAM 332. Data and instructions may transfer unidirectionally to processors 320 from ROM 334. RAM 332 and ROM 334 may include any suitable computer-readable storage media.

Computer system 300 includes fixed storage 340 coupled bi-directionally to processors 320. Fixed storage 340 may be coupled to processors 320 via storage control unit 352. Fixed storage 340 may provide additional data storage capacity and may include any suitable computer-readable storage media. Fixed storage 340 may store an operating system (OS) 342, one or more executables 344, one or more applications or programs 344, data 348, and the like. Fixed storage 340 is typically a secondary storage medium (such as a hard disk) that is slower than primary storage. In appropriate cases, the information stored by fixed storage 340 may be incorporated as virtual memory into memory 330.

Processors 320 may be coupled to a variety of interfaces, such as, for example, graphics control 354, video interface 358, input interface 360, output interface 362, and storage interface 364, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 356 may couple processors 320 to another computer system or to network 110. With network interface 356, processors 320 may receive or send information from or to network 110 in the course of performing steps of particular embodiments. Particular embodiments may execute solely on processors 320. Particular embodiments may execute on processors 320 and on one or more remote processors operating together.

In a network environment, where computer system 300 is connected to network 110, computer system 300 may communicate with other devices connected to network 110. Computer system 300 may communicate with network 110 via network interface 356. For example, computer system 300 may receive information (such as a request or a response from another device) from network 110 in the form of one or more incoming packets at network interface 356 and memory 330 may store the incoming packets for subsequent processing. Computer system 300 may send information (such as a request or a response to another device) to network 110 in the form of one or more outgoing packets from network interface 356, which memory 330 may store prior to being sent. Processors 320 may access an incoming or outgoing packet in memory 330 to process it, according to particular needs.

Computer system 300 may have one or more input devices 366 (which may include a keypad, keyboard, mouse, stylus, etc.), one or more output devices 368 (which may include one or more displays, one or more speakers, one or more printers, etc.), one or more storage devices 370, and one or more storage medium 372. An input device 366 may be external or internal to computer system 300. An output device 368 may be external or internal to computer system 300. A storage device 370 may be external or internal to computer system 300. A storage medium 372 may be external or internal to computer system 300.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 330 may include one or more computer-readable storage media embodying software and computer system 300 may provide particular functionality described or illustrated herein as a result of processors 320 executing the software. Memory 330 may store and processors 320 may execute the software. Memory 330 may read the software from the computer-readable storage media in mass storage device 330 embodying the software or from one or more other sources via network interface 356. When executing the software, processors 320 may perform one or more steps of one or more processes described or illustrated herein, which may include defining one or more data structures for storage in memory 330 and modifying one or more of the data structures as directed by one or more portions the software, according to particular needs. In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A computer-implemented method comprising:
   accessing a first page of one or more pages, the first page comprising a plurality of keywords;
   ranking the plurality of keywords of the first page according to their relative degrees of popularity based at least on
     (a) for each keyword of the plurality of keywords, a number of page views of pages tagged with the keyword, or
     (b) for each keyword of the plurality of keywords, a number of queries, issued to one or more search engines, that include the keyword; and
   visually distinguishing the each keyword of the plurality of keywords of the first page according to their popularity ranking;
   wherein the method is performed by one or more computing devices.

2. The computer-implemented method of claim 1, further comprising automatically creating a hyperlink from at least one of the keywords to one of the pages.

3. The computer-implemented method of claim 1, wherein for each of the plurality of keywords, its relative degree of popularity is further based on a number of times the keyword appears in the pages identified for the keyword.

4. The computer-implemented method of claim 1, wherein the plurality of keywords are visually distinguished by color, size, highlighting, font, or other visual indication.

5. The computer-implemented method of claim 1, further comprising:
   selecting one or more nouns from words in the first page; and
   for each of the nouns,
     determining a number of times the noun appears in the first page; and
     if the number satisfies a threshold requirement, then identifying the noun as one of the plurality of keywords.

6. A method comprising:
   accessing a first network resource that comprises one or more keywords;
   for at least one of the one or more keywords in the first network resource, a computer-implemented tool automatically performing the steps of:
     requesting a search engine to conduct a search on the keyword;
     obtaining information that identifies a plurality of second network resources identified by the search engine as a result of the search conducted on the keyword; and
     presenting the plurality of second network resources to a user;
     receiving, from the user, a selection of a second network resource of the plurality of second network resources;
     in response to receiving the selection, automatically inserting, into the first network resource, a hyperlink to the second network resource.

7. The method claim 6, wherein:
   the one or more keywords are a plurality of keywords;
   the keyword is a first keyword of the plurality of keywords;
   for each keyword of the plurality of keywords other than the first keyword, the computer-implemented tool automatically performing the steps of:
     requesting the search engine to conduct a second search on said each keyword;
     obtaining information that identifies a plurality of third network resources identified by the search engine as a result of the second search conducted on said each keyword; and
     presenting the plurality of third network resources to the user;
     receiving, from the user, a selection of a third network resource of the plurality of third network resources;
     in response to receiving the selection, automatically inserting, into the first network resource, a hyperlink to the third network resource.

8. The method of claim 6, further comprising:
   the computer-implemented tool automatically analyzing the first network resource to identify the one or more keywords.

9. The method of claim 6, further comprising:
   selecting the one or more keywords from one or more words in the first network resource;
   selecting one or more nouns from the words in the first network resource; and
   for each of the nouns,
     determining a number of times the noun appears in the first network resource; and
     if the number satisfies a threshold requirement, identifying the noun as one of the keywords.

10. One or more non-transitory storage media storing instructions which, when executed by one or more processors cause performance of the method recited in claim 1.

11. One or more non-transitory storage media storing instructions which, when executed by one or more processors cause performance of the method recited in claim 2.

12. One or more non-transitory storage media storing instructions which, when executed by one or more processors cause performance of the method recited in claim 3.

13. One or more non-transitory storage media storing instructions which, when executed by one or more processors cause performance of the method recited in claim 4.

14. One or more non-transitory storage media storing instructions which, when executed by one or more processors cause performance of the method recited in claim 5.

15. One or more non-transitory storage media storing instructions which, when executed by one or more processors cause performance of the method recited in claim 6.

16. One or more non-transitory storage media storing instructions which, when executed by one or more processors cause performance of the method recited in claim 7.

17. One or more non-transitory storage media storing instructions which, when executed by one or more processors cause performance of the method recited in claim 8.

18. One or more non-transitory storage media storing instructions which, when executed by one or more processors cause performance of the method recited in claim 9.

* * * * *